United States Patent
Liu et al.

(10) Patent No.: US 10,986,287 B2
(45) Date of Patent: Apr. 20, 2021

(54) CAPTURING A PHOTO USING A SIGNATURE MOTION OF A MOBILE DEVICE

(71) Applicant: Samsung Electronics, Co. Ltd., Suwon-si (KR)

(72) Inventors: David Liu, Plano, TX (US); Michael Polley, Garland, TX (US); Youngjun F. Yoo, Plano, TX (US); Hamid Rahim Sheikh, Allen, TX (US); Kaimo Lin, Richardson, TX (US); George Chen, Plano, TX (US); Chenchi Luo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/369,071

(22) Filed: Mar. 29, 2019

(65) Prior Publication Data

US 2020/0267331 A1    Aug. 20, 2020

Related U.S. Application Data

(60) Provisional application No. 62/807,567, filed on Feb. 19, 2019.

(51) Int. Cl.
| | |
|---|---|
| *H04N 5/228* | (2006.01) |
| *H04N 5/265* | (2006.01) |
| *G06F 3/01* | (2006.01) |
| *G06T 7/00* | (2017.01) |
| *H04N 5/232* | (2006.01) |

(52) U.S. Cl.
CPC ............. *H04N 5/265* (2013.01); *G06F 3/017* (2013.01); *G06T 7/0002* (2013.01); *H04N 5/23299* (2018.08); *G06T 2207/10016* (2013.01); *G06T 2207/30168* (2013.01); *H04N 5/23238* (2013.01)

(58) Field of Classification Search
CPC ............................................ G06T 2207/20084
See application file for complete search history.

(56) References Cited

U.S. PATENT DOCUMENTS

| | | | |
|---|---|---|---|
| 7,120,313 B2 | 10/2006 | Katake et al. | |
| 8,477,200 B2 | 7/2013 | Fujita et al. | |
| 10,230,888 B2 * | 3/2019 | Lou | .................... H04N 5/23241 |

(Continued)

FOREIGN PATENT DOCUMENTS

| | | |
|---|---|---|
| JP | 2011000215539 | 10/2019 |
| KR | 1020080050994 | 6/2007 |

OTHER PUBLICATIONS

ORB-SLAM: A Versatile and Accurate Monocular SLAM System, by Raul Mur-Artal, J. M. M. Montiel and Juan D. Tardos' published Oct. 5, 2015.

(Continued)

*Primary Examiner* — Gary C Vieaux
(74) *Attorney, Agent, or Firm* — John J. King

(57) ABSTRACT

A method of capturing a photo using a mobile device is described. The method comprises detecting a signature motion of the mobile device; capturing video using a camera of the mobile device upon detecting the signature motion; and automatically identifying a start frame and an end frame of the captured images using neural networks. A mobile device for capturing a photo is also described.

20 Claims, 8 Drawing Sheets

(56) References Cited

U.S. PATENT DOCUMENTS

| | | |
|---|---|---|
| 2008/0062291 A1 | 3/2008 | Sako |
| 2008/0192125 A1 | 8/2008 | Kang et al. |
| 2009/0021576 A1 | 1/2009 | Linder et al. |
| 2011/0199470 A1* | 8/2011 | Moller .............. G06F 1/1686 348/61 |
| 2012/0165074 A1* | 6/2012 | Soldan .............. G06F 3/0488 455/566 |
| 2012/0281960 A1* | 11/2012 | Boncha .............. H04N 5/772 386/224 |
| 2013/0329074 A1 | 12/2013 | Zhang et al. |
| 2014/0139696 A1* | 5/2014 | Lee .............. G06F 3/017 348/211.4 |
| 2014/0147092 A1 | 5/2014 | Liu et al. |
| 2015/0229840 A1 | 8/2015 | Sawai et al. |
| 2015/0309582 A1 | 10/2015 | Gupta |
| 2016/0014336 A1 | 1/2016 | Han et al. |
| 2016/0028972 A1 | 1/2016 | Gallup et al. |
| 2016/0065847 A1* | 3/2016 | Jiang .............. G06F 3/017 348/207.1 |
| 2016/0119530 A1 | 4/2016 | Chen et al. |
| 2017/0013194 A1 | 1/2017 | Lee et al. |
| 2017/0178346 A1* | 6/2017 | Ferro .............. G06N 3/04 |
| 2017/0257559 A1 | 9/2017 | Sticker |
| 2017/0270508 A1* | 9/2017 | Roach .............. G06Q 20/042 |
| 2017/0347035 A1 | 11/2017 | Kim et al. |
| 2018/0198982 A1 | 7/2018 | Lee et al. |
| 2019/0180149 A1* | 6/2019 | Knittel .............. G06K 9/6267 |
| 2020/0005025 A1 | 1/2020 | Fu et al. |

OTHER PUBLICATIONS

VINS-Mono: A Robust and Versatile Monocular Visual-Inertial State Estimator, byTong Qin, Peiliang Li, and Shaojie Shen, published Aug. 2017.

Cyclic Motion Detection for Motion Based Recognition by Tsai et al., University of Central Florida, published Jun. 1994.

* cited by examiner ized by a processor to perform a method, overcome disadvantages of conventional image capture modes by allowing the user to move a mobile device having a camera in a predetermined way, allowing the device to automatically take a photo or a video.

CAPTURING A PHOTO USING A SIGNATURE MOTION OF A MOBILE DEVICE

FIELD OF THE INVENTION

An embodiment of the invention relates generally to capturing images, and in particular, to capturing a photo using a mobile device.

BACKGROUND OF THE INVENTION

Many mobile devices, such as digital cameras, wireless communication devices such as cellular telephone, and mobile computer devices such as laptop or tablet computers, have one or more cameras that enable a user to conveniently capture images at any time. However, there may be occasions where users of a mobile device may not have both hands free, making it difficult to both hold the mobile device and make the necessary contact with the mobile device (e.g. contact with a button or a touch screen display of the mobile device) to take a photograph or record a video.

Pressing a physical button or a touch screen to capture a photograph or video can also lead to unnecessary movement of the camera, particularly when capturing a photograph or video while holding the mobile device with one hand, or even when holding the device with both hands.

Further, when capturing an image that may comprise multiple images (also known as frames), such as in a panoramic view, it may be necessary for the user to carefully compose the photo, such as moving the camera in a single direction when scanning a scene for example. That is, the user cannot move the camera freely, but rather may be required to move the camera in one direction in order to generate a good panoramic picture. Also, there may be undesirable artifacts with one dimensional motion while taking a panoramic image.

Accordingly, there is a need for devices and methods for capturing a photo using a mobile device that overcome problems associated with conventional devices and methods.

SUMMARY OF THE INVENTION

A method of capturing a photo using a mobile device. The method comprises detecting a signature motion of the mobile device; capturing video using a camera of the mobile device upon detecting the signature motion; and automatically identifying a start frame and an end frame of the captured video using neural networks.

A mobile device for capturing a photo is also disclosed. The mobile device comprises a processor coupled to receive images from a camera, wherein the processor: detects a signature motion of the mobile device; captures video using the camera of the mobile device upon detecting the signature motion; and automatically identifies a start frame and an end frame of the captured video using neural networks.

A non-transitory computer-readable storage medium may also have data stored therein representing instructions executable by a processor to perform a method comprising: detecting a signature motion of the mobile device; capturing video using a camera of the mobile device upon detecting the signature motion; and automatically identifying a start frame and an end frame of the captured video using neural networks.

DETAILED DESCRIPTION OF THE DRAWINGS

Figure 1:
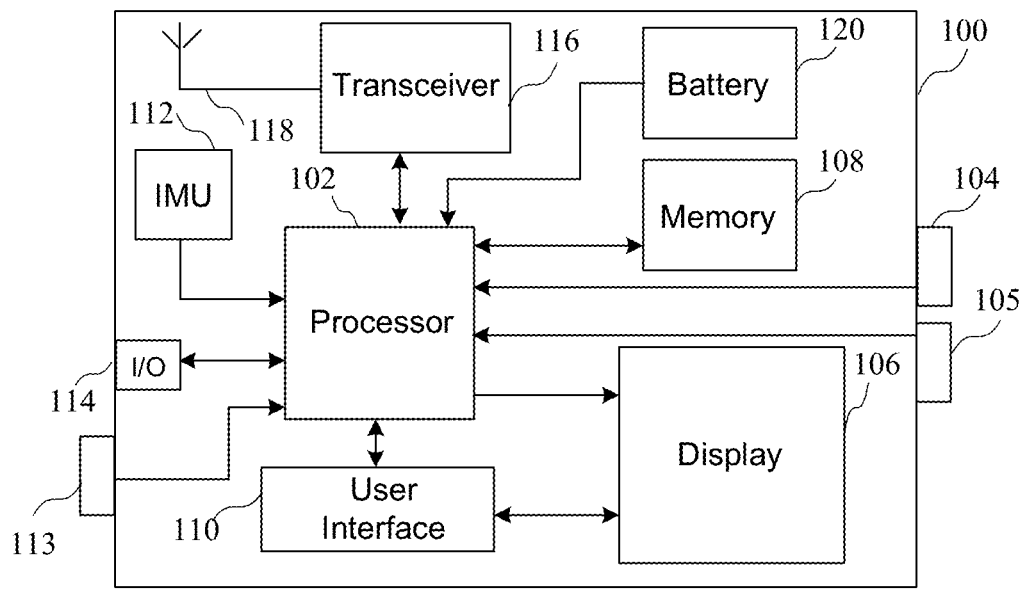
FIG. 1 is an exemplary block diagram of an electronic device having a camera.

The devices and methods, including a non-transitory computer-readable storage medium having data stored therein representing instructions executable by a processor to perform a method, overcome disadvantages of conventional image capture modes by allowing the user to move a mobile device having a camera in a predetermined way, allowing the device to automatically take a photo or a video. The automatic capturing of a photo that may be composed of several images or a video eliminates the need for a user to press a button on the mobile device. The motion can be a signature motion that is detected by the mobile device, which may be a periodic, cyclic or repeated pattern for example. That is, the detection of the signature motion may be used to start an image capture process for capturing a plurality of images used in a video or for a photo that is a composite of multiple photos. According to some implementations, the mobile device can learn the signature motion. Further, 3D point cloud construction can be used to allow for common frame detection, and particularly avoid the need to maintain the motion in one dimension when capturing multiple frames to be used in a photo, such as a panoramic photo for example. Start and end frames that cover frames that are determined to be good frames can be defined, where good frames may contain 3D points that appear in at least a predetermined number of frames for example.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Before describing the figures in more detail below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C; A and B; A and C; B and C; and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Turning first to FIG. 1, a block diagram of an electronic device having multiple cameras is shown. The exemplary electronic device 100, which may be a mobile device for example, may be any type of device having one or more cameras, such as a digital camera, a wireless communication device such as cellular telephone, a mobile computer device such as laptop or tablet computer, or a head mounted device (HMD). The electronic device 100 may comprise a processor 102 coupled to a plurality of cameras 104 and 105. The processor 102, alone or in combination with other elements on the electronic device or external to the electronic device, may be used for capturing a photograph (also commonly called a photo) as described in more detail below. While cameras 104 and 105 are shown, it should be understood that the cameras comprise image recording devices, such as image sensors, and that the cameras may be independent of each other or may share circuitry. Also, a single camera or more than 2 cameras may be implemented. The processor 102 is an integrated electronic circuit such as, for example, an ARM processor, an X86 processor, a MIPS processor, a graphics processing unit (GPU), a general-purpose GPU, or any other processor configured to execute instructions stored in a memory. The processor 102 could be implemented in one or more processing devices, where the processors may be different. For example, the electronic device could include a central processing unit (CPU) as well as a GPU for example.

The processor 102 may be coupled to a display 106 for displaying information to a user. The processor 102 may also be coupled to a memory 108 that allows storing information related to data or information associated with achieving a goal. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic device or external memory accessible by the electronic device.

A user interface 110 is also provided to enable a user to both input data and receive data. The user interface could include a touch screen user interface commonly used on a portable communication device, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112, which may include a gyroscope and an accelerometer for example, can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information to the mobile device. The processor 102 may receive input data by way of an input/output (I/O) port 114 or a transceiver 116 coupled to an antenna 118. While the mobile device of FIG. 1 is shown by way of example, it should be understood that other mobile devices having other combinations of elements than those shown, including for example additional cameras or additional or different sensors for tracking the movement of the mobile device.

Figure 2:
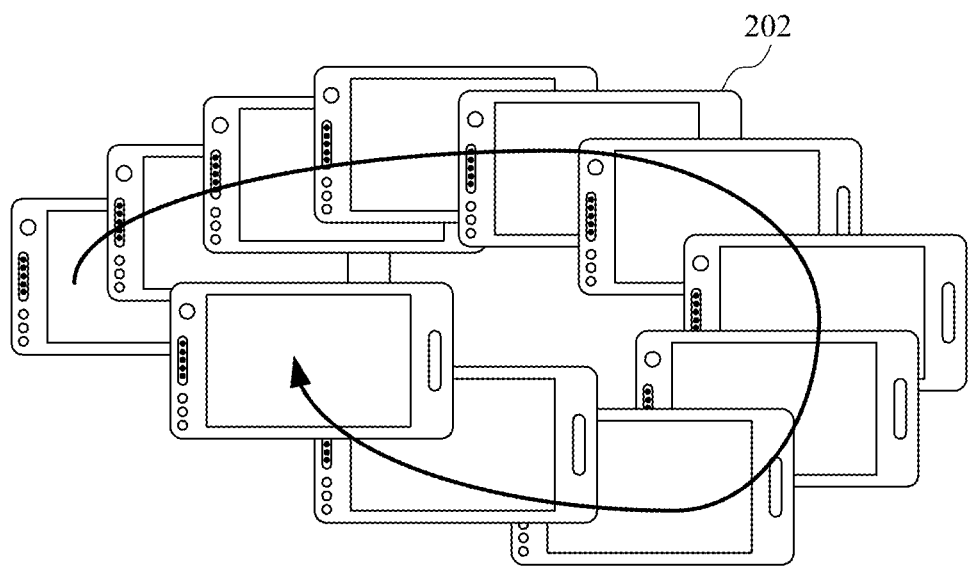
FIG. 2 is an exemplary diagram showing a signature motion indicating a start of an image capture event.

Turning now to FIG. 2, an exemplary diagram shows a signature motion indicating a start of an image capture event. More particularly, a device 202, shown here by way of example as a mobile device, such a wireless communication device or any other mobile device having one or more cameras, can be moved in a signature motion, where one or more sensor elements on the device will detect that signature motion, as will be described in more detail below. By using sensors of the mobile device to detect a signature motion, a user may wave his phone freely, where a video or photo based upon a plurality of images may be generated without selecting a shutter button. The video or photo may be further cropped and enhance based upon aesthetic photography, such as by using photographic techniques including for example the ⅓ rule, dominant lines, leveling, lighting control, etc. Accordingly, the devices and methods implemented using the device 202 may provide a device smart shutter (i.e., a device having no need to select a shutter button) and smart compose (i.e., a device having no need for a user of the device to be involved in image composition). One example of a signature motion that it is used to detect when a user intends to take a picture is shown by the movement of the device 202 along the path corresponding to the bold line as shown in FIG. 2. It should be understood that other signature motions could be used, and that the motion could be pre-defined, or learned from the user. The motion could be any 2-dimensional or 3-dimensional motion.

Figure 3:
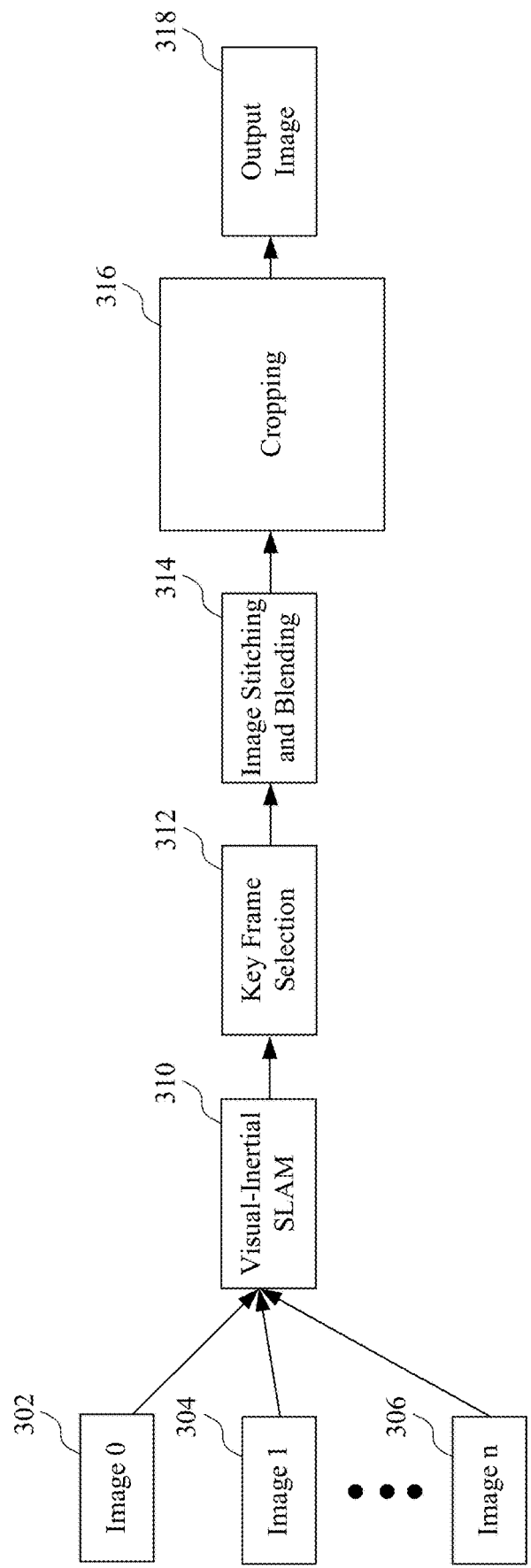
FIG. 3 is an exemplary block diagram showing generating an output image based upon a plurality of images in response to the detection of a signature motion.

Turning now to FIG. 3, an exemplary block diagram shows the generation of an output image based upon a plurality of images in response to the detection of a signature motion. As shown in FIG. 3, a plurality of images 302-306 may be captured, where for example the captured images could be associated with a video or a picture that may be composed of more than one image. The plurality of images could be taken automatically in response to the detection of a signature motion, which indicates that a user of the mobile device intends to capture a video or photo. As will be set forth in more detail below, the particular images (also known as frames) of the plurality of images that are captured after the detection of the signature motion and are included in a video (or a composite picture having a plurality of images) can be determined after a signature motion is detected.

The plurality of images may be provided to a Visual-Inertial simultaneous location and mapping (SLAM) block 310, which may be used for detecting objects in the scenes captured by the camera, including objects that can be used for example in 3D mapping to enable the selection of images that meet a criteria for being included in a video or as a photo or part of a photo comprising a plurality of images, as will be described in more detail below. An output of the SLAM block 310 may be provided to a Key Frame Selection block 312 that selects frames that could be used to generate a video or a picture that comprises a plurality of images after a signature motion is detected.

The frames selected to be included in a photograph having a plurality of images can be combined into a single image in an Image Stitching and Blending block 314. The image or images generated by the Image Stitching and Blending block 314 may optionally be provided to an cropping block 316, an output of which is an output image 318, which may be a video or photo. Examples of cropping described in more detail below in reference to FIGS. 8 and 9.

Figure 4:
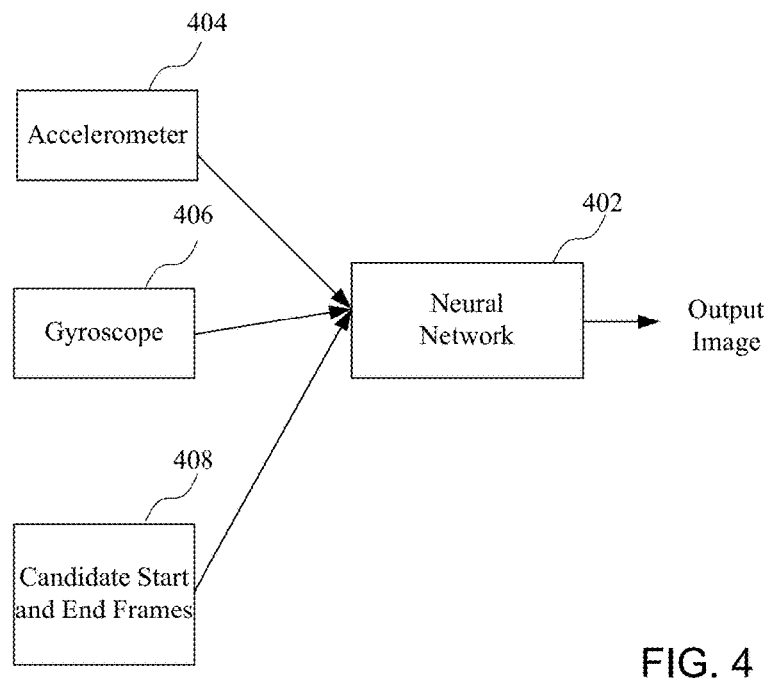
FIG. 4 is an exemplary block diagram showing a use of a neural network in generating an output image.

Turning now to FIG. 4, an exemplary block diagram shows a use of a neural network in generating an output image. According to the implementation of FIG. 4, a Neural Network 402 is configured to receive outputs of an accelerometer 404, a gyroscope 406, and candidate start and end frames 408. The Neural Network 402 uses acceleration data from the accelerometer 404 and motion data from the gyroscope 406, as well as candidate start and end frames to generate an output image, which may be a photo comprising a plurality of images or a video. For example, the Neural Network 402 may be used to determine the signature motion based upon actions of the user of the mobile device, and also determine content of the output image that the user intends to capture. It should be understood that the output image could be generated using a processor of a mobile device having one or more cameras, using both a process of a mobile device of the camera and a remote computer (e.g. a cloud-based computer), or using a remote computer that receives the input data from the accelerometer, gyroscope and candidate start and end frames, and provides an output image back to the mobile device. According to some implementations, the candidate start and end frames can be generated using a processor of a mobile device, where the Neural Network 402 may determine a start frame and an end frame from the candidate start and end frames and generate the output image, as will be described in more detail below in reference to FIG. 5.

Figure 5:
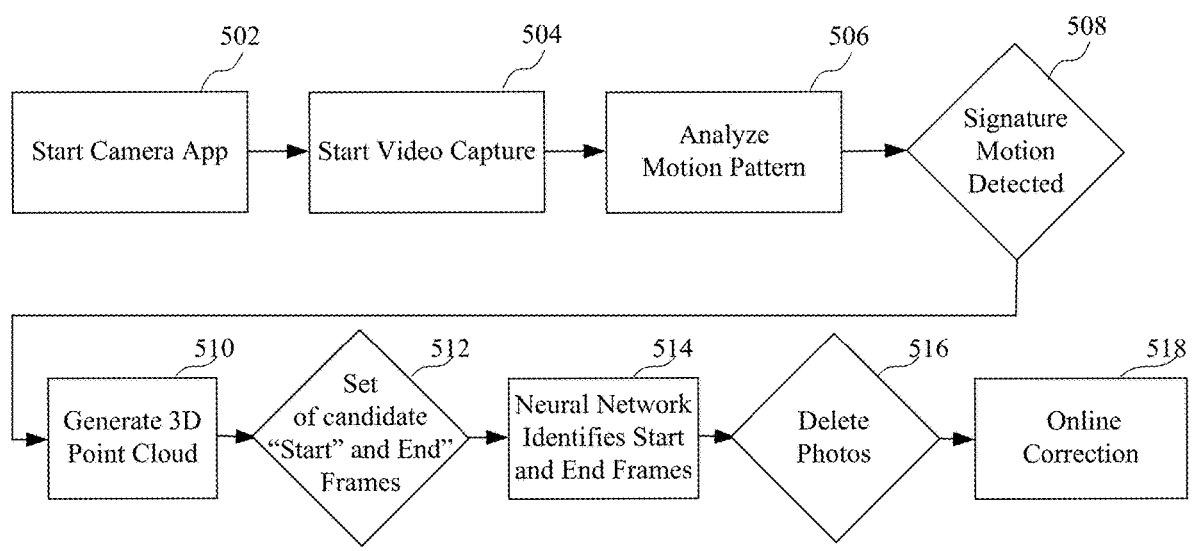
FIG. 5 is an exemplary block diagram showing the selection of images of a plurality of images during a video capture process.

Turning now to FIG. 5, an exemplary block diagram shows a selection of images of a plurality of images during a video capture process. While a video capture process is described, it should be understood that the video capture process may be for capturing a photo comprising a single image or a plurality of images. According to the implementation of FIG. 5, a camera application (app) may be started on a mobile device at a block 502, where video capture is started at a block 504. Motion patterns are analyzed at a block 506. However, it should be noted that it is not necessary that a camera app is started by a user. Rather, motion of the mobile device could be continuously monitored and motion patterns may be continuously analyzed to detect a signature motion to start the process to generate an output image, including starting the capture of images after a signature motion is detected.

According to some implementations, the IMU motion sensors on the mobile device, including for example a gyroscope and an accelerometer, digitize the motion pattern, where the digital signal is subsequently analyzed to determine whether a signature motion is detected at a block 508. As set forth above, a signature motion could be any motion detected, such as by the mobile device using sensors of the mobile device, that could be identified as a motion indicating that the user of the mobile device desires to capture a video or picture. If a signature motion is detected, a 3D point cloud is generated at a block 510. The 3D point cloud comprises images having points associated with elements of a scene, such as elements that may be distinctive and easily identifiable between multiple images for example. The points can then be used to determine whether a given image is consistent with other images, and could be considered part of a video or an image that is used with other images to create a photo comprising a composite of the images.

After the signature motion is detected and a 3D point cloud is generated, a set of candidate start and end frames may also be determined based upon data from the 3D point cloud at a block 512. If a group of images comprises similar points which may be appearing in different locations of the image as a camera is moved, it may be determined that the images are likely good images for a photo or video. For example, if each image of a group of captured images includes a predetermined number of points, those images are likely to be considered good images. It may also be required that a predetermined number of images having the predetermined number of points may be required for the images to be considered a good image. After a signature motion of a mobile device is detected, it may be easily determined that some images are not intended to be a part of a video or would be selected for a photo. That is, after a user of the mobile phone completes a signature image, the camera of the mobile phone may be pointed in a direction that does not include elements having points identified in later images. For example, after the signature motion is detected, the camera may be pointed toward the ground, where analysis of multiple images after the detection of the signature image would reveal that certain images were likely not intended to be captured and those frames that do not capture the desired target of the video can be discarded. Start and end frames from the set of candidate start and end frames generated by the candidate Start and end frames may be generated at a block 514.

A Neural Network can then be used to identify candidate start and end frames, and the best start and end frames from the set of candidate start and end frames in blocks 512 and 514. For example, the Neural Network may determine start and end frames based upon videos or photos previously captured by a user, videos or photos commonly captured by other users, or any other analysis of the content of the images, such as elements associated with the 3D points, that would help determine start and end frames. According to some implementations, the mobile device may automatically identify "start" and "end" frames, wherein all images before "start" and after "end" are deleted.

In a first step for identifying start and end frames, a neural network for identifying start and end frames, such as a Recursive Neural Network (RNN) or the Long short-term memory (LSTM) could be used to determine likely start and end frames. While and RNN or LSTM can require more battery power and a complex CPU that may be expensive to compute, cyclic motion detection could be performed according to some implementations, with autocorrelation and Fourier transform techniques for the smoothed spatio-temporal function of IMU gyroscope and accelerometer trajectories. A large impulse in a Fourier magnitude plot could be used to indicate the frequency at which cycles are occurring. Because cyclic motion detection is based on analyzing IMU signals, it is computationally less expensive compared to methods that involve analysis of video frames.

A second step of determining start and end frames may involve two sub-steps: a first step to perform 3D point cloud reconstruction, and a second step to perform common-frames-detection. The first sub-step may be implemented using a SLAM method (such as ORB-SLAM or VINS-MONO) which can be used to generate the 3D point cloud. In the second sub-step, the 3D points in the space are categorized into "good points" and "bad points". Good points are points that are frequent and common, which means they appear in many frames, such as 10 frames for example.

After the good points are identified, "good frames" may then be determined. Good frames are frames that appear many times (i.e. have a predetermined number of good points for example), such as 10 times. Then, a set of candidate "start" and "end" frames are identified. Each set of "start" and "end" frames may uniquely correspond to a range of frames (e.g. 30 frames). If within this range of frames at least a percentage P of the frames (such as P=90%) are good frames, then this set of "start" and "end" frames becomes a candidate set. The output is a set of "start" and "end" frames, for example three sets of Frames [31~60], [45~65], and [5~268], each of which contains 30, 21, and 17 frames, respectively. Any subinterval of these ranges may also contain at least a percentage of P good frames; for example, [31~60] fully contains [32~60], which may also contain more than P % of good frames, and all intervals that are fully contained within larger intervals are discarded.

A third step uses a Deep Learning method (e.g. using a Neural Network) to determine the best start and end frame, given the candidate ranges from the previous step. For example, a LSTM model (Long Short Term Memory) method can be used. According to one implementation, a Peephole convolutional LSTM could be used and which has the following form:

$$i_t = \sigma(W_{xi}x_t + W_{hi}h_{t-1} + W_{ci}c_{t-1} + b_i); \quad \text{EQ 1}$$

$$f_t = \sigma(W_{xf}x_t + W_{hf}h_{t-1} + W_{cf}c_{t-1} + b_f); \quad \text{EQ 2}$$

$$z_t = \tanh(W_{xi}x_t + W_{hi}h_t + b_i); \quad \text{EQ 4}$$

$$c_t = f_t \odot c_{t-1} + i_t \odot z_t; \quad \text{EQ 3}$$

$$o_t = \sigma(W_{xo}x_t + W_{ho}h_{t-1} + W_{co}c_t + b_o); \text{ and} \quad \text{EQ 5}$$

$$h_t = \sigma_t \odot \tanh(c_t); \quad \text{EQ 6}$$

wherein $X\_t$ is an input vector to the LSTM unit, $f\_t$ is a forget gate's activation vector; $i\_t$ is an input gate's activation vector; $o\_t$ is an output gate's activation vector; $h\_t$ is a hidden state vector also known as output vector of the LSTM unit; $c\_t$ is a cell state vector; W, U, and b are weight matrices and bias vector parameters which need to be learned during training, and the superscripts d and h refer to the number of input features and number of hidden units, respectively. The sigma is called the sigmoid function, which is well known in neural network theory and in statistics. LSTM may be beneficial because it is a class of artificial neural network which can use an internal state (i.e. memory) to process sequences of inputs. The system receives one frame after another, which is a sequence of inputs, and the hidden state vector $h\_t$ can represent whether the frame at time t represents the "start" or "end" frame of a sequence of frames. The input features can come from three sources including an accelerometer from IMU sensor (e.g. 1-D discrete time series); a gyroscope from IMU sensor (e.g. 1-D discrete time series); and a set of candidate ranges from the previous step. All these input features may be formed as a vector and provided as input into LSTM equations. The output of LSTM may be multi-class where 0 means "use first range"; 1 means "use second range", and so on.

A user may also affect which photos may be a part of a video or a composite photo at a block 516. For example, a user may delete one or more photos within a predetermined time period, such as 4 seconds, where the deleted photo would not be used as a part of a composite photo or video, and may provide information that could be used to determine which elements of the images are intended to be captured by the user. The ability of a user to delete a photo enables the user to "personalize" the neural network for the specific user of a device. If the user deletes the latest photo within a specific time limit (for example, 10 seconds), then it means there was probably some failure happening during the automated process. Such a "negative feedback" will be used as a negative example for the neural network online learning, hence reducing the likelihood for the neural network to make similar mistakes in the future.

A photo may also selected between start and end images, as will be described in more detail below. According to some implementations, the photo may be blended from multiple frames, and may comprise a panorama image for example. Online correction may also be performed at a block 518. According to some implementations, the online correction may include implementing image processing techniques to improve the quality of the image. Example of some image processing techniques are described below in reference to FIGS. 8 and 9.

While some or all of the determinations performed according to the implementation of FIG. 5, such as whether a signature motion is detected, determining a set of candidate start and end frames, and identifying best start and end frames, may be performed on the mobile device, it should be understood that any determinations not performed on the mobile device could be performed on an external device, such as a device in communication with the mobile device. For examples determinations not performed on the mobile device could be performed remotely on a cloud-based server for example. The method of FIG. 5 overcomes the drawbacks associated with pressing a shutter button at inconvenient times or when operating a mobile device having a camera using one hand, or creating unintentional handshakes when pressing a shutter button.

Figure 6:
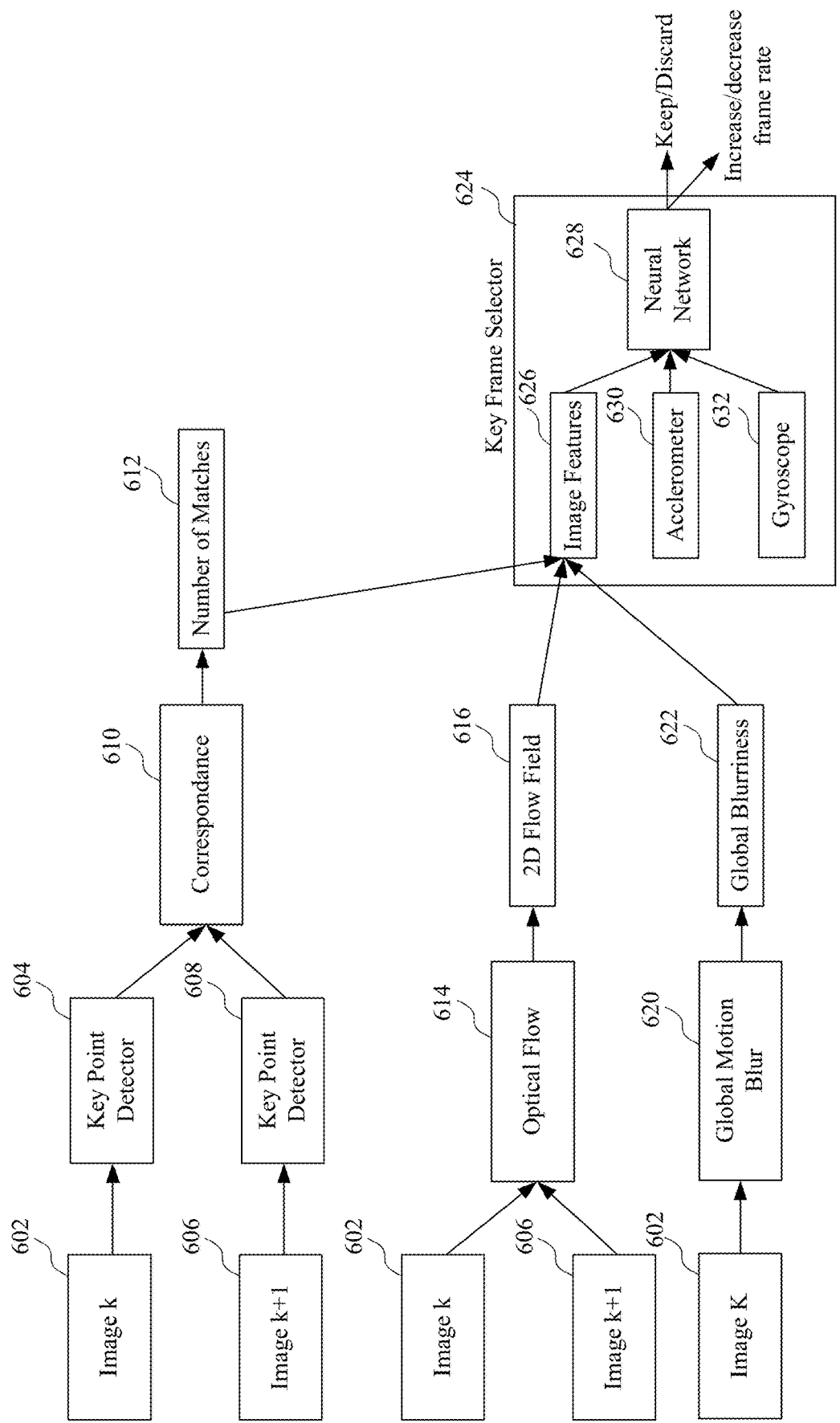
FIG. 6 is another exemplary block diagram showing the generation of an output image based upon a plurality of images in response to the detection of a signature motion.

Turning now to FIG. 6, another exemplary block diagram shows the generation of an output image based upon a plurality of images in response to the detection of a signature motion, such as during blocks 512 and 514 of FIG. 5. More particularly, FIG. 6 shows a generation of inputs provided to a key frame selector and an operation of a key frame selector, such as the Key Frame Selection block 312 of FIG. 3 for example. A number of inputs are generated and used by a key frame selector, and could be generated by the Visual-Inertial SLAM block 310 for example. According to the implementation of FIG. 6, a plurality of images, shown here by way of example K+1 images which may be sequential images taken by a camera of a mobile device, are processed according to the implementation of FIG. 6, where an input Image K 602 is provided to a first Key Point Detector 604 and an input image K+1 606 is provided to a Second Key Point Detector 608. Outputs of the Key Point Detector 604 and the Key Point Detector 608 are compared in a Correspondence Block 610 to determine whether key points of the compared images correspond to one another and to generate a number of matches 612 based upon those comparisons. The number of matches 612 is used by the key frame selector to determine whether the images are similar enough that they could be intended to be in a video or could be candidates for photo comprises a plurality of images that are blended. The key points may be points of a 3D point cloud as described above.

The images K and K+1 are also provided to an optical flow block 614 to generate a 2D flow field 616. For every pixel (x1,y1) in frame t, the optical flow block 614 determines its corresponding pixel (x2,y2) in frame t+1. That is, a "correspondence" means that, since there is movement either of the camera or the scene, the same "object" or "feature" in the scene has now shifted from location x1,y1 to x2,y2. An output of the optical flow field 614 comprises a 2D Flow Field values 616. A flow field is an image with the same size as the original image, but where there are two values at each pixel location delta_x and delta_y. More specifically, flow field at pixel location (x1,y1) is defined as (x2−x1, y2−y1), where (x2,y2) is coming from the Optical Flow block 614. For example, if neither the camera nor the scene has moved, then the flow field is (0,0) for every pixel location. The 2D flow field values 616 generated by the Optical Flow block 614 contains motion information for both the camera and the scene, and therefore is also useful for determining the key frames.

At least one image, shown by way of example here as image K 602, is provide to a Global Motion Blur block 620 to generate a Global Blurriness value 622. The Global blurriness value is a measure of how many pixels are "blurry". If there is a lot of motion, then the image will likely become blurrier. If an image is very blurry, then it may be determined that it should be discarded and not used for stitching when creating a photo.

A Key Frame Selector 624 is configured to receive the number of matches 612, the 2D Flow values 616, and the Global Blurriness value 622 at an Image Features block 624, an output of which is provided to a Neural Network block 626. The image features block 624 receives all information that is originated or derived from one or more image sensor (as opposed to the IMU sensors such as the accelerometer and gyroscope) and that is defined as "Image Features". The Neural Network block is also configured to receive an output of an accelerometer 630 and an output of a gyroscope 632. The neural network block may implement for example a convolutional neural network (CNN), such as a Long Short-Term Memory (LSTM) CNN, or a recursive neural network (RNN). The Neural Network block 628 generates a number of decisions, including whether to keep or discard an image or increase or decrease a frame rate for example.

Figure 7:
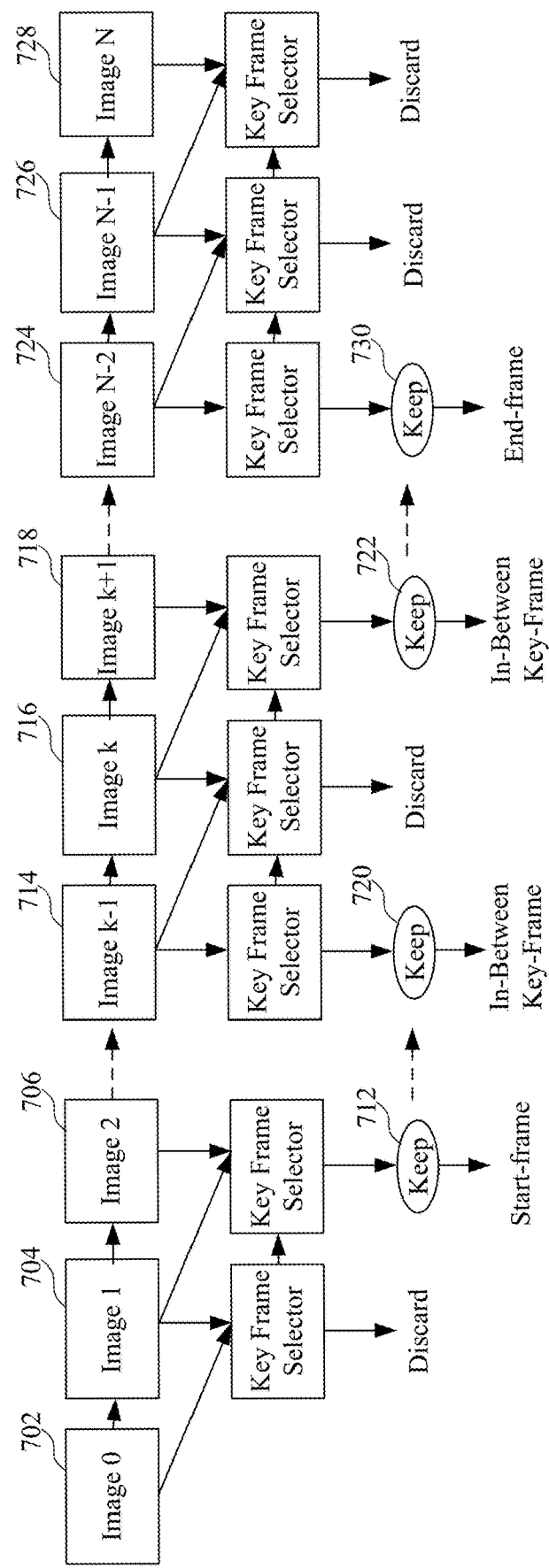
FIG. 7 is an exemplary diagram showing a selection of images including a start frame and an end frame of a plurality of frames detected after a signature motion is detected.

Turning now to FIG. 7, an exemplary diagram shows a selection of images including a start frame and an end frame of a plurality of frames detected after a signature motion is detected. FIG. 7 shows the determination of a start frame and an end frame, and the discarding of frames before and after the start frame and the end frame. A first plurality of images, shown here by way of example as 3 images including Image 0 702, Image 1 704 and Image 2 706 are provided to key frame selector, which may be for example Key Frame Selector 624 as described above in reference to FIG. 6, where the key frame selector is used for comparing sequential images as they are processed to identify both start frames and end frames, and frames between the start frame and end frame that should be kept or discarded. The Key Frame Selector also compares Image 0 and Image 1 to determine whether to keep an image as a start frame. Based upon the comparison of Image 0 and Image 1 by the Key Frame Selector, the images discarded (i.e. not selected as a start frame), while Image 2 is kept as a frame 712 according to the example of FIG. 7, which may be selected as a start frame as described above in reference to FIGS. 1-6.

After the start frame is selected, subsequent images are also compared by the Key Frame Selector to determine whether to keep or discard images after the start frame and before an end frame. For example, in another series of images 714-718 that are compared, the Key Frame Selector may determine to keep Image k−1 as a frame 720, discard image k and keep image k+1 as a frame 722. Image N−2 of another series of images 724-728 may be kept by the Key Frame Selector as a frame 730, which may be an end frame for example. As shown in FIG. 7, the images N−1 and N are discarded because they are after the end frame. While the images are shown in groups for purposes of showing a start frame, and end frame, and frames between the start frame and the end frame that may be discarded, it should be understood that the processed images could include may more images before the start frame, between the start frame and the end frame, and after the end frame.

Figure 8:
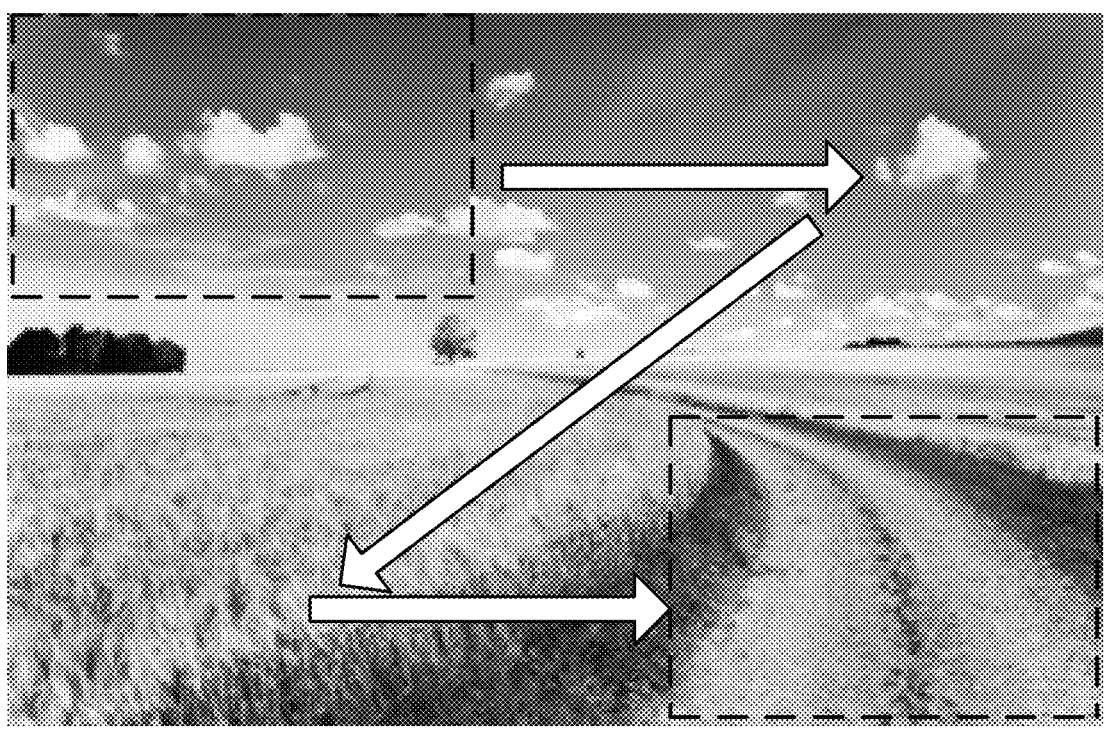
FIG. 8 is an image showing an exemplary cropping and enhancing of an image.

Turning now to FIG. 8, an image shows an exemplary cropping and enhancing. Cropping the photo according to the example of FIG. 8 involves the estimation of a bounding box, shown by the dashed line. Bounding box placement can be achieved using a multi-resolution sliding window approach for example, which may be similar to object detection methods. Features such as contrast, histogram of hue, horizon, vanishing point, etc. are computed and evaluated in a sliding window, which raster scans the entire image at multiple resolutions. Training data for building such a classifier can be collected offline, such as via human experts who annotate one or multiple bounding boxes per image. During classification, the bounding box with the highest classification score is retained and subsequently cropped as the final output image.

Figure 9:
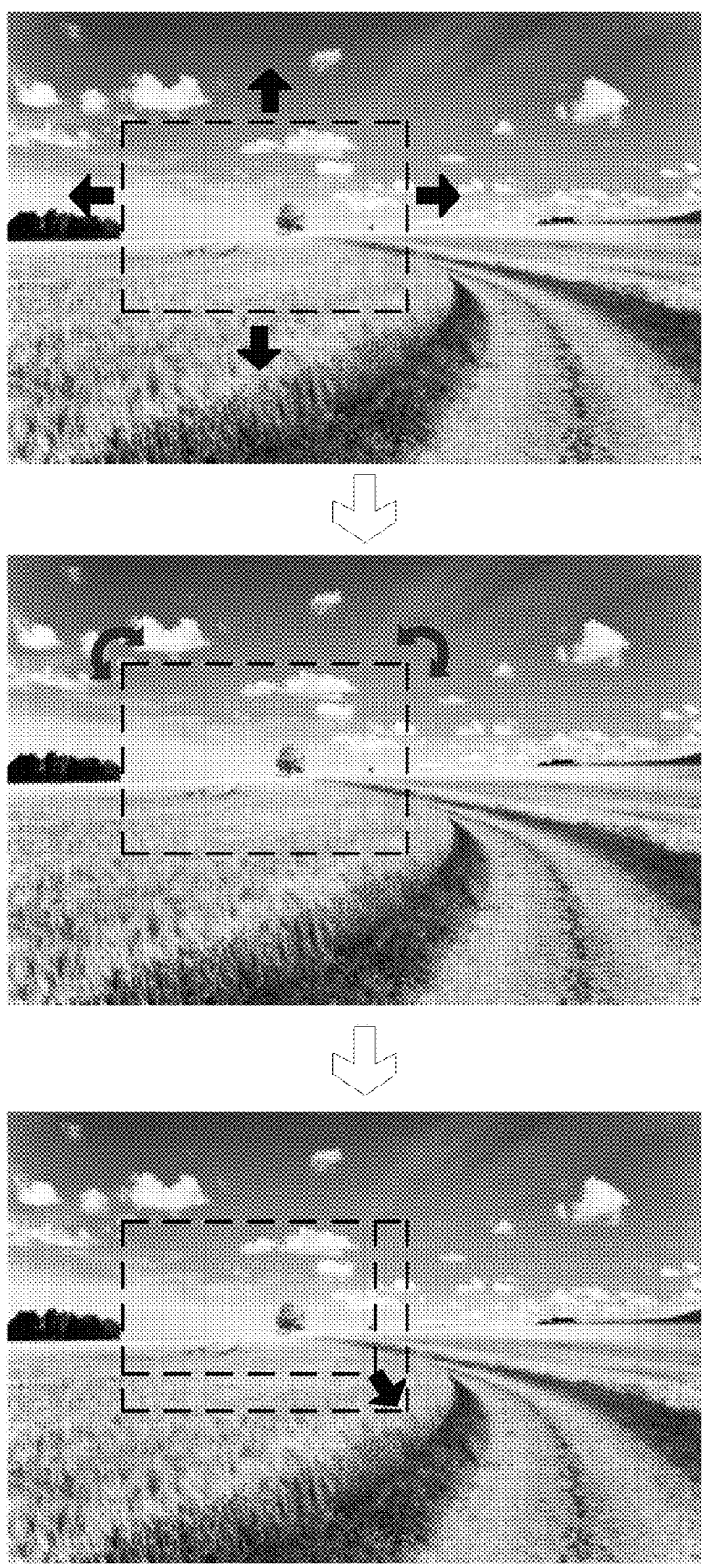
FIG. 9 is a group of images showing movement, rotation and scaling of a portion of an image.

Turning now to FIG. 9, a group of images show movement, rotation and scaling of a portion of an image. A bounding box will gradually move to desired position/orientation/scale, without the need of exhaustive search and scan. A Convolutional Neural Network (CNN) which may be used here may consist of N convolutional layers. Once entire image is processed, individual sub-windows do not need to be processed through the first N layers, where only the feature maps of the last layer needs to be stored to avoid exhaustive scan. Feature maps of rotated images may also be stored. Since most photographs only need a small amount of rotation (such as +/−15 degrees), rotation can be discretized into a small number of different levels.

Alternatively, deep reinforcement learning cropping can be used for performing enhancing and cropping. A sequence of state-actions may defined as a trajectory τ: {s0, a0, s1, a1 . . . s_T, a_T}. The actions may be generated from an actor following a certain policy function. The reward function may be defined as d(s,a), which is parameterized by Θ. A Deep Neural Network may be applied to d(s,a), where Θ represents its parameters. A Policy Gradient approach may be used to optimize the Deep Neural Network's parameters in order to maximize the expected total reward. The policy gradient may have the following form:

$$\Theta^\pi \leftarrow \Theta^\pi + \eta \nabla_{\Theta}^\pi E\pi[D(\tau)] \rightarrow \Theta^\pi \leftarrow \Theta^\pi + \eta \sum_{i=1}^{N} D(\tau_i) \nabla \Theta \pi \log P(\tau_i \mid \pi); \quad \text{EQ 7}$$

where D(τ) is the mean of the rewards d(s, a) over the complete state-action sequence from t=0 to t=T and N is the number of expert-annotated trajectories, collected as part of the data annotation process.

The possible actions may also be defined. For example, the actor can select between Move (to left, right, up, or down by m pixels) as shown in the top image of FIG. 9, Rotate (clockwise or counter-clockwise by r degrees) as shown in the middle image of FIG. 9, and Scale (the width and height by s pixels) as shown in the bottom image of FIG. 9. The initial bounding box can be set as the same size and orientation as the original image. In each iteration of training the Deep Neural Network, the d(s,a) function may be updated so that expert trajectories have larger reward than the actor, while the actor may be trained by conventional Reinforcement Learning to maximize the D(.) function.

While performing training data collection, ground truth data for training a CNN-LSTM neural network may use high quality (i.e. slower) blur detection, as well as denser key point detection. A manually designed threshold value may be used to determine keep/discard based on the number of correspondences and the blurriness combined. Optionally, a motion capture (mocap) system may provide the ground truth position of the camera for verification of the correctness of the overlap of field of view of two neighboring camera frames for example.

Figure 10:
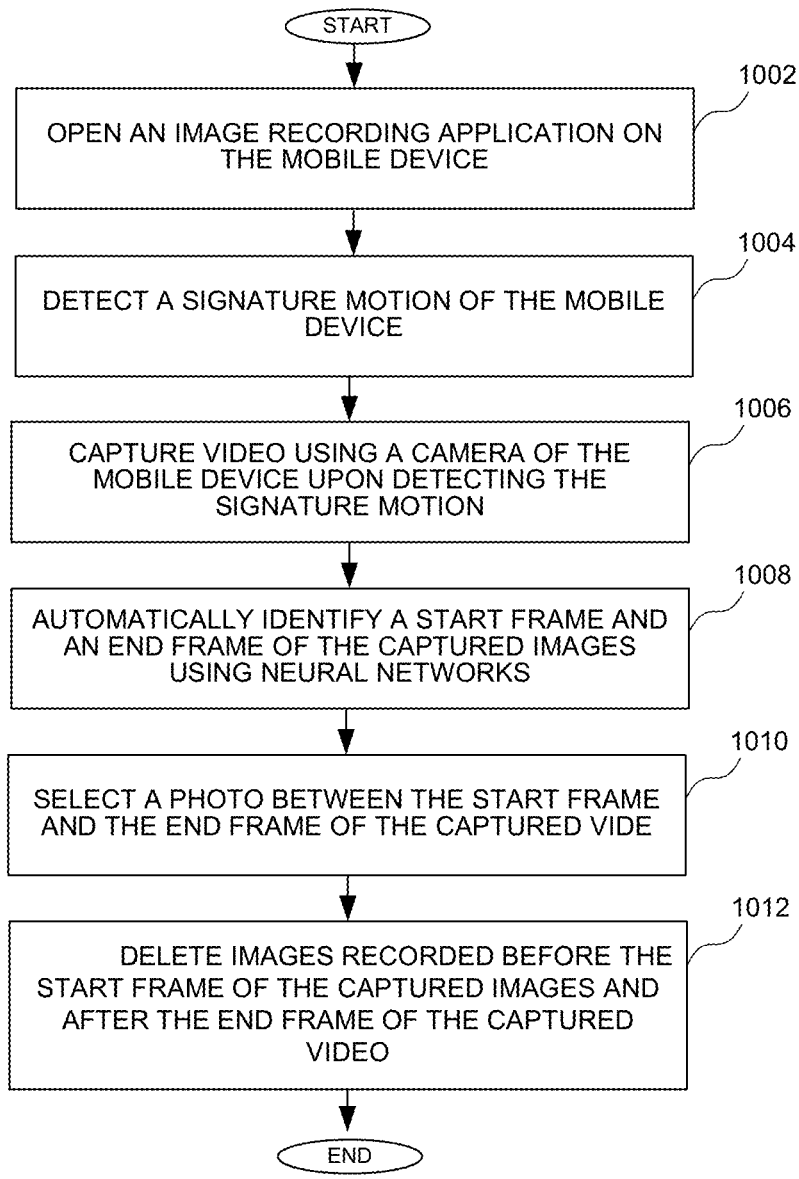
FIG. 10 is flow chart showing a method of capturing a photo using a mobile device.

Turning now to FIG. 10 is flow chart showing a method of capturing a photo using a mobile device. An image recording application is opened on the mobile device at a block 1002. A signature motion of the mobile device is detected at a block 1004, such as a mobile device 100 of FIG. 1 for example. Video is captured using a camera of the mobile device upon detecting the signature motion at a block 1006. A start frame and an end frame of the captured images is automatically identified using neural networks at a block 1008. The start and end frames may be determined as described above in reference to FIGS. 5 and 6 for example. A photo between the start frame and the end frame of the captured video is selected at a block 1010. Images recorded before the start frame of the captured images and after the end frame of the captured video may deleted at a block 1012. According to some implementations, a 3D point cloud may be generated, and a set of start frames and end frames of the captured images may determined based upon data of the 3D point cloud, as described above.

The various elements of the methods of FIG. 10 may be implemented using the circuits of FIGS. 1-9 as described, or using some other suitable circuits. While specific elements of the method are described, it should be understood that additional elements of the method, or additional details related to the elements, could be implemented according to the disclosure of FIGS. 1-8.

It can therefore be appreciated that new circuits for and methods of capturing a photo using a mobile device have been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of capturing a video using a mobile device, the method comprising:
    detecting a signature motion of the mobile device, wherein the detection of the signature motion starts a video capture process;
    capturing video, using a camera of the mobile device, upon detecting the signature motion;
    determining whether frames of the captured video include a target of the video;
    automatically identifying, by a processor, at least one of a start frame and an end frame of the captured video based upon the determining whether frames of the captured video include a target of the video;
    analyzing, by the processor, frames of the captured video between the start frame and the end frame; and
    determining, by the processor, frames between the start frame and the end frame to be discarded, wherein a frame is determined to be discarded based upon a comparison of the frame to another frame of the captured video.

2. The method of claim 1, wherein the camera captures the video after an image recording application is opened on the mobile device.

3. The method of claim 1, further comprising deleting images of the captured video recorded before the start frame of the captured video and after the end frame of the captured video.

4. The method of claim 1, further comprising selecting a photo captured between the start frame and the end frame of the captured video.

5. The method of claim 4, wherein the photo is blended from multiple images.

6. The method of claim 1, further comprising determining a set of start frames and end frames of the captured images based upon data of a 3D point cloud.

7. The method of claim 1, wherein determining frames between the start frame and the end frame to be discarded comprises determining frames that do not capture a target of the video.

8. A mobile device for capturing a video, the mobile device comprising:
a processor coupled to receive images from a camera, wherein the processor:
detects a signature motion of the mobile device, wherein the detection of the signature motion starts a video capture process;
captures video using the camera of the mobile device upon detecting the signature motion;
determines whether frames of the captured video include a target of the video;
automatically identifies a start frame and an end frame of the captured video based upon the determining whether frames of the captured video include a target of the video;
analyzes frames of the captured video between the start frame and the end frame; and
determines frames between the start frame and the end frame to be discarded, wherein a frame is determined to be discarded based upon a comparison of the frame to another frame of the captured video.

9. The mobile device of claim 8, wherein the camera captures the video after an image recording application is opened on the mobile device.

10. The mobile device of claim 8, wherein the processor further deletes images of the captured video before the start frame and after the end frame.

11. The mobile device of claim 8, wherein the processor further selects a photo between the start frame and the end frame of the captured video.

12. The mobile device of claim 11, wherein the photo is blended from multiple frames.

13. The mobile device of claim 8, wherein the processor further determines a set of start frames and end frames of the captured images based upon data of a 3D point cloud.

14. The mobile device of claim 8, wherein determining frames between the start frame and the end frame to be discarded comprises determining frames that do not capture a target of the video.

15. A non-transitory computer-readable storage medium having data stored therein representing instructions executable by a processor to perform a method comprising:
detecting a signature motion of a mobile device, wherein the signature motion starts a video capture process;
capturing video using a camera of the mobile device upon detecting the signature motion;
determining whether frames of the captured video include a target of the video;
automatically identifying a start frame and an end frame of the captured video based upon the determining whether frames of the captured video include a target of the video;
analyzing frames of the captured video between the start frame and the end frame; and
determining frames between the start frame and the end frame to be discarded, wherein a frame is determined to be discarded based upon a comparison of the frame to another frame of the captured video.

16. The non-transitory computer-readable storage medium of claim 15, wherein the camera captures the video after an image recording application is opened on the mobile device.

17. The non-transitory computer-readable storage medium of claim 15, further comprising deleting images of the captured video recorded before the start frame and after the end frame.

18. The non-transitory computer-readable storage medium of claim 15, further comprising selecting a photo between the start frame and the end frame of the captured video.

19. The non-transitory computer-readable storage medium of claim 18, wherein the photo is blended from multiple frames.

20. The non-transitory computer-readable storage medium of claim 15, further comprising determining a set of start frames and end frames of the captured video based upon data of a 3D point cloud.

* * * * *